Patented Apr. 26, 1927.

1,626,113

UNITED STATES PATENT OFFICE.

PAUL CAMPION, OF VITRY-SUR-SEINE, FRANCE, ASSIGNOR TO A. B. DICK COMPANY, OF CHICAGO, ILLINOIS, A CORPORATION OF ILLINOIS.

MANUFACTURE OF STENCILS FOR DUPLICATING APPARATUS.

No Drawing. Application filed October 15, 1923, Serial No. 668,768, and in Belgium January 4, 1923.

This invention relates to stencil-sheets for duplicating machines, such as the mimeograph, and particularly to that type of stencil-sheet employing an open, porous base, such as Japanese yoshino, coated with a solution of soluble cotton in combination with a material, such as castor oil, which will combine with the cotton, a suitable solvent, such as alcohol, ether, acetone and the like, being employed to dissolve the cotton and to aid in bringing the compound as a whole to the proper consistency for coating the yoshino in an approved manner, as, for example, by immersing it in or drawing it over the surface of the coating bath. The object of the present invention is to improve upon coating compounds of this general character in the direction of attaining greater flexibility, durability and impermeability.

In carrying out the invention in an approved form, I employ, by way of example, a 2½% solution of collodion or celluloid in a suitable solvent such as ether or alcohol ether (in the case of collodion) or acetone with or without ether or alcohol ether (in the case of celluloid), and with this I combine a suitable quantity, say approximately 40%, of castor oil. To the compound so constituted, I add a suitable quantity of a fatty substance, such as stearic acid or other suitable animal fat or acid, together with triacetin, or, in the alternative or in addition, an equivalent chemical of the same general character for the purposes of this invention, such as tartrate of butyl or tartrate of amyl. The triacetin (or its equivalent) acts in the compound as an additional softening agent and, more particularly, as an internal lubricant facilitating the movement of that part of the coating impacted by the type. When the fatty substance commonly known as stearic acid is used, good results can be obtained by the addition of approximately four per cent of this to the coating compound. Of triacetin or the tartrates above mentioned, approximately three per cent will be found sufficient. Where a fatty substance, such as stearic acid is employed, should this develop a tendency to crystallize, after the coating has been applied to the sheet, I preferably employ a suitable chemical such as benzilic alcohol, having the effect in the compound of preventing, or contributing to the prevention of such crystallization.

What I claim is:—

1. A stencil sheet having a porous base, such as yoshino, provided with a type-impressible coating including cellulose nitrate, oil, and a glycerol fatty acid ester.

2. A stencil sheet having a porous base, such as yoshino, provided with a type-impressible coating including cellulose nitrate, oil and triacetin.

3. A stencil sheet having a porous base, such as yoshino, provided with a type-impressible coating including cellulose nitrate, oil, a fatty substance and triacetin.

4. A stencil sheet having a porous base, such as yoshino, provided with a type-impressible coating including cellulose nitrate, oil, a fatty substance of animal origin and triacetin.

5. A stencil sheet having a porous base, such as yoshino, provided with a type-impressible coating including cellulose nitrate, oil, a fatty substance, and a substance having the property of preventing crystallization of said fatty substance.

6. A stencil sheet having a porous base, such as yoshino, provided with a type-impressible coating including cellulose nitrate, oil and dibutyl tartrate.

7. A stencil sheet having a porous base, such as yoshino, provided with a type-impressible coating including cellulose nitrate, oil, dibutyl tartrate and triacetin.

This specification signed this 22 day of Sept., 1923.

PAUL CAMPION.